Patented Nov. 28, 1933

1,937,032

UNITED STATES PATENT OFFICE 1,937,032

CENTRAL LUBRICATING APPARATUS FOR CONSISTENT GREASE

Alfred Schlosshauer, Berlin, Germany

Application May 18, 1931, Serial No. 538,359, and in Germany May 19, 1930

6 Claims. (Cl. 184—36)

This invention relates to a central pumping apparatus for grease in which consistent grease is conveyed with the aid of distributing devices rotating in the storage receptacle, to a series of lubricant pumps which in turn press the grease into a corresponding number of lubricating conduits. As consistent grease possesses practically no hydrostatic pressure, it cannot be conveyed at all or only with difficulty, especially with pumps which suck badly and consequently it has been endeavoured to move the consistent grease to the feed channels of the pump by static or kinetic pressure, but also in this instance a reliably operating central pumping apparatus is only possible under certain conditions. This is due to the fact that small or large air spaces are always enclosed in the consistent grease, so that the pumps have to fulfill the duty of conveying a mixture of a compressible substance with a non-compressible substance which has proved absolutely impossible against a high resistance.

According to the invention on a scraper plate forming with a sieve wall of the receptacle a wedge-shaped space closed on all sides with the exception of the end lying in the direction of movement, a vertical peeling knife is arranged above the opening at the front end of the scraper, this knife standing parallel along its entire length to and bearing against the wall of the receptacle whereas at the side of the opening at the front end of the scraper plate a stationary scraper is fixed on an axle in the bottom plate of the receptacle and is inclined in such a manner that it scrapes off any grease lumps circulating with the scraper plate and allows these loosened lumps to slide downwards and outwards so that they are gripped by the wedge-shaped space formed by the scraper plate and the sieve wall and pressed against the sieve wall.

As the distributing device arranged in the storage receptacle not only forces the consistent grease in the direction towards the sieve partition, but also under a certain pressure through the partition, it is preferable to construct the sieve in the shape of a low cylinder and to arrange same within the range of the lower end of the wall of the storage receptacle and to make the rotary distributing element in the shape of a cylindrical part with spiral-shaped curve in such a manner that between the sieve partition and the scaper plate a wedge-shaped space is produced, which is only of very slight width at its narrowest point. Owing to the moving of a scraper plate of such shape directly along the sieve wall, the air particles contained in the grease escape to such an extent that the conveying of the lubricant can be effected with perfect reliability.

In order to prevent damaging of the sieve wall, this is made of a strong perforated plate.

It is possible to fit sieves, for cleaning and holding back foreign bodies, in different manners in the path of the consistent grease entirely independently of the separate sieve partition, which serves particularly for the air separation and also for placing the grease under pressure within the range of the suction channels of the conveyor pumps.

Two embodiments of the invention are illustrated by way of example in the accompanying drawings in which:—

Figure 1:
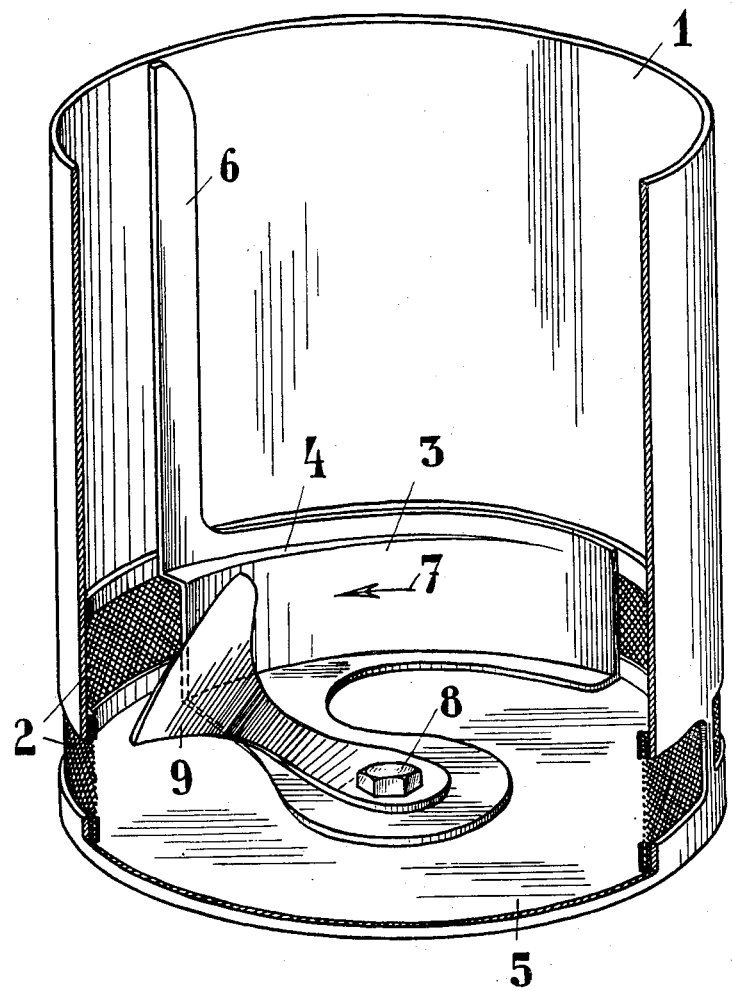
Fig. 1 shows the storage receptacle of a central lubricating apparatus with built in sieve partition and the main parts of the distributing device in conjunction with a scraper knife.

On the lower end of the storage receptacle 1 for the consistent grease, a cylindrical sieve wall 2 is arranged, which covers the feed channels for the lubricant pumps, not shown in the drawings and through which the lubricant is forced with the aid of a distributing device. A scraper plate 3 serves as distributor which is covered at the top by a wall portion 4 and extends downwards towards the bottom plate 5 of the receptacle 1 so far that a wedge-shaped space is formed, closed on all sides, with the exception of the front surface. Owing to the continual progressive conveying movement of the scraper plate 3, the lubricant is brushed under pressure into the space in front of the feed channels of the conveyor pumps so that, as the pressure decreases after each passage of the scraper plate 3, the grease is freed from the air by the fine perforations of the sieve wall 2, the air bubbles being pressed outwards by the expanding lubricant. The fine perforations in the sieve wall 2 cause at the same time the mass of the lubricant forced into the space in front of the feed channels to be held back at this point without the pressure in the lubricant mass becoming entirely lost. Consequently the consistent grease flows from the space behind the sieve wall 2 under pressure into the lubricant conveyor pumps, thereby their suction effect is considerably assisted. The sieve body 2 is constructed as a cylinder so that it can easily be removed and cleaned. Further the cylindrical shape presents the advantage of low constructional height and great resistance against deformations.

The special construction of the scraper plate 3 causes the lubricant to enter the wedge-shaped space through the end surface thereof where it remains under pressure until a sufficient quantity of the viscous grease mass has been pressed through the fine perforations of the sieve wall 2 to pass off through the suction channels of the pump.

On the front edge of the scraper plate 3 a vertical peeling knife 6 is further arranged, which slides closely along the wall of the receptacle 1 and which, during the circulation of the scraper plate 3 in the direction of the arrow 7 by any suitable means not shown in the drawings, removes any lump of grease, which may adhere to the wall of the receptacle 1 so that this grease slides down and is pressed by the scraper plate 3 into the wedge-shaped space directed towards the sieve wall 2.

In order to prevent grease from adhering to the inner surface of the scraper plate 3 and from rotating with this plate without being fed, a stationary axle 8 is provided in the centre of the bottom plate 5 of the receptacle on which axle a stripper 9 of sheet metal or the like is mounted, which is inclined in such a manner that it scrapes off any lumps of grease circulating with the scraper plate 3 and allows these loosened lumps of grease to slide downwards and especially outwards so that they are gripped by the wedge-shaped space of the scraper plate 3 and can be pressed against the sieve wall 2.

Figure 2:
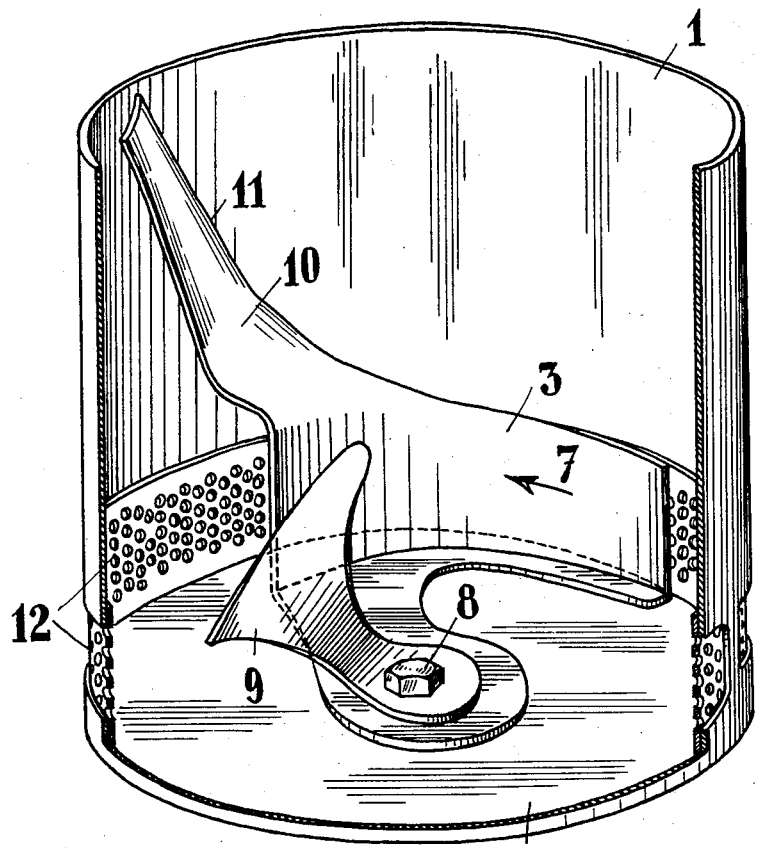
Fig. 2 shows a second form of construction of a distributor device, in which instead of the scraper knife a scraper plate is upwardly extended in the shape of a feeding device, the sieve wall being formed of perforated sheet metal.
Figure 3:
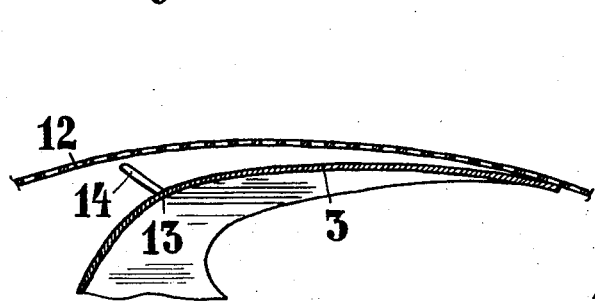
Figs. 3 and 4 show the fitting of a coarse rake on the scraper plate.
Figure 4:
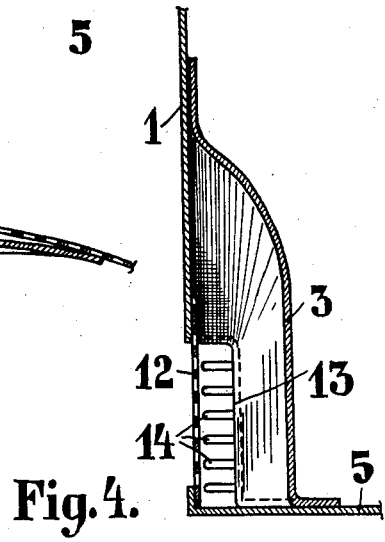

In the form of construction illustrated in Fig. 2, the sieve wall is composed of a strong perforated plate 12, through which the lubricant is pressed into the space in front of the suction channels of the conveyor pumps, not shown in the drawings. This plate prevents damaging of the wall, such as might easily occur, when using a wire sieve and would lead to a failure and interruption of the lubricant feed to the points of consumption. The scraper plate 3 is in this instant constructed in such a manner that its front aperture is shaped in the form of a projection 10, extending to near the upper edge of the receptacle 1, the upper edge 11 of this projection forming the peeling knife scraping along the wall of the receptacle. The projection 10 is inclined towards the front in the direction of rotation 7 and is of bent cross section so that it pushes the grease near the wall of the receptacle axially in downward direction and at the same time brushes it radially outwards so that it is pressed under pressure into the wedge-shaped space of the scraper plate 3. In order to as far as possible keep foreign bodies away from the sieve or plate wall 2 and 12 respectively, it is preferable to provide the scraper plate with a coarse rake, as shown in Figs. 3 and 4. The front aperture of the scraper plate 3 is then so constructed that it widens suddenly towards the front edge from the point 13 so that at this point 13 a coarse rake can be mounted, which consists of a plurality of horizontal bars 14 inclined towards the front in the direction of rotation. Larger foreign bodies, such as screws, nuts, rivets, pins or chips or stone, can be thus held away from the wall 2, whereas smaller bodies are allowed to pass through and slip out under the resiliently yielding end of the scraper plate 3, without causing any damage whatever to the smooth and strong perforated sieve plate.

In order to obtain a perfect lubricant feed, it is advisable to connect the scraper plate or plates of the lubrication distributer with the driving mechanism in such a position and in such number that they always pass along the feed channels during the suction stroke of the lubricant conveyor pumps.

I claim:—

1. A central lubricating apparatus for consistent grease, in which the lubricant is conveyed towards the channels of the lubricant pumps, comprising in combination a grease receptacle closed at its bottom end and having a cylindrical wall, a sieve forming the lower portion of the cylindrical wall of said receptacle and having meshes sufficiently small to separate the small air bubbles from the consistent grease, and a rotatable scraper plate in said receptacle bearing against the wall of said receptacle and said sieve adapted to press the grease through said sieve partition and maintain the same at a pressure on the outer side of said sieve partition.

2. A central lubricating apparatus as specified in claim 1, comprising in combination with the receptacle, the sieve partition and the scraper plate, a plough share-like radially set stationary stripper arranged in the centre of said receptacle, extending to near the inner wall of said scraper plate adapted to scrape the grease from said plate.

3. A central lubricating apparatus as specified in claim 1, comprising in combination with the sieve partition and the scraper plate, a coarse rake arranged on said scraper plate having pins extending substantially in the direction towards said sieve wall adapted to prevent large foreign bodies from entering between said plate and the sieve partition.

4. A central lubricating apparatus as specified in claim 1, comprising in combination with the sieve partition and the scraper plate, a suddenly widening portion at the front aperture of said scraper plate and a coarse rake fitted in said suddenly widening portion adapted to prevent large foreign bodies from penetrating between said partition and said plate.

5. In central lubricating apparatus as specified in claim 1 the scraper plate comprising a horizontal portion, a curved vertical portion with a radius eccentric from the fulcrum of the plate forming with the sieve a wedge shaped space closed at its rear end and open at its front end in the direction of rotation, an outwardly bent portion on the upper edge of said vertical portion forming the top wall of said wedge shaped space, and an upwardly bent extension on the front end of said outwardly bent portion extending parallel to and bearing along its entire length against the wall of the receptacle.

6. In central lubricating apparatus as specified in claim 1 the scraper plate comprising a horizontal portion, a curved vertical portion with a radius eccentric from the fulcrum of the plate forming with the sieve a wedge shaped space closed at its rear end and open at its front end in the direction of rotation, an outwardly bent portion on the upper edge of said vertical portion forming the top wall of said wedge shaped space and an upwardly and forwardly bent extension on the front end of said outwardly bent portion bearing along the entire length of its rear edge against the wall of the receptacle adapted to guide the grease adhering to the wall of the receptacle into said wedge shaped space.

ALFRED SCHLOSSHAUER.